July 31, 1934.  C. L. VICK ET AL  1,968,726
ELECTRIC IGNITION AND BATTERY LOCK
Filed Dec. 2, 1932   3 Sheets-Sheet 2
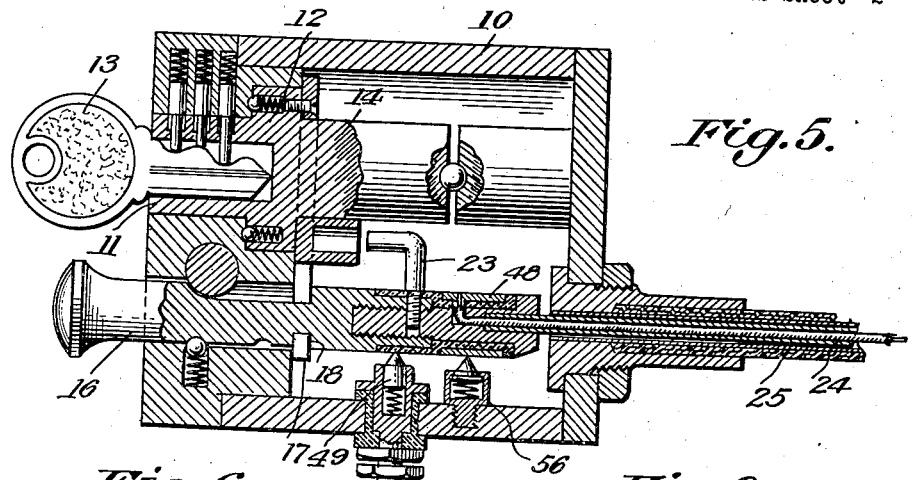
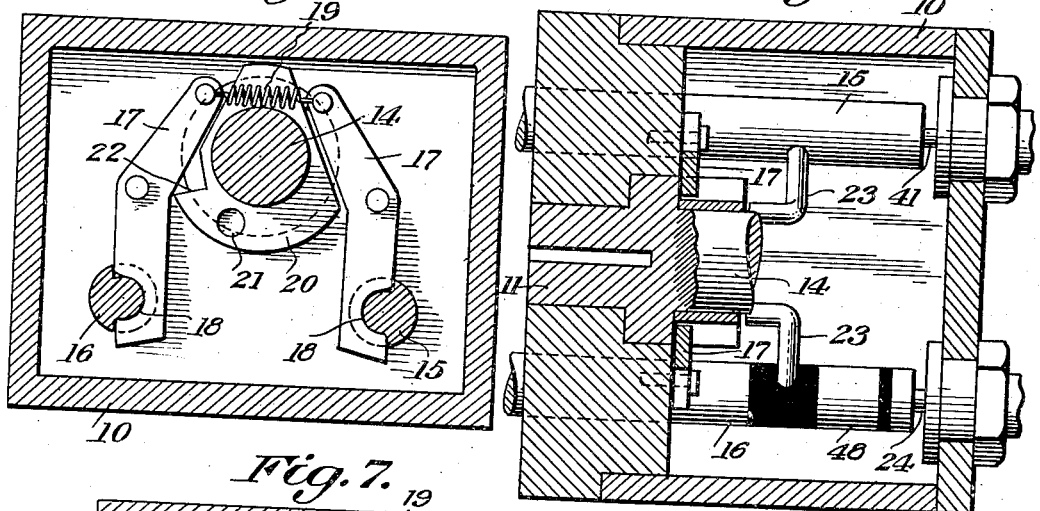
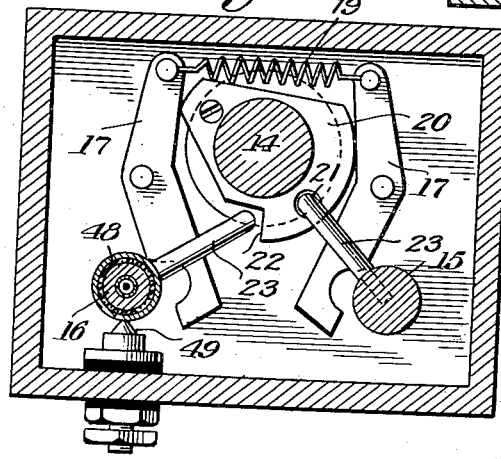
Charles L. Vick
Nathan Adams
INVENTOR
BY Victor J. Evans & Co.
ATTORNEYS July 31, 1934.  C. L. VICK ET AL  1,968,726
ELECTRIC IGNITION AND BATTERY LOCK
Filed Dec. 2, 1932   3 Sheets-Sheet 3
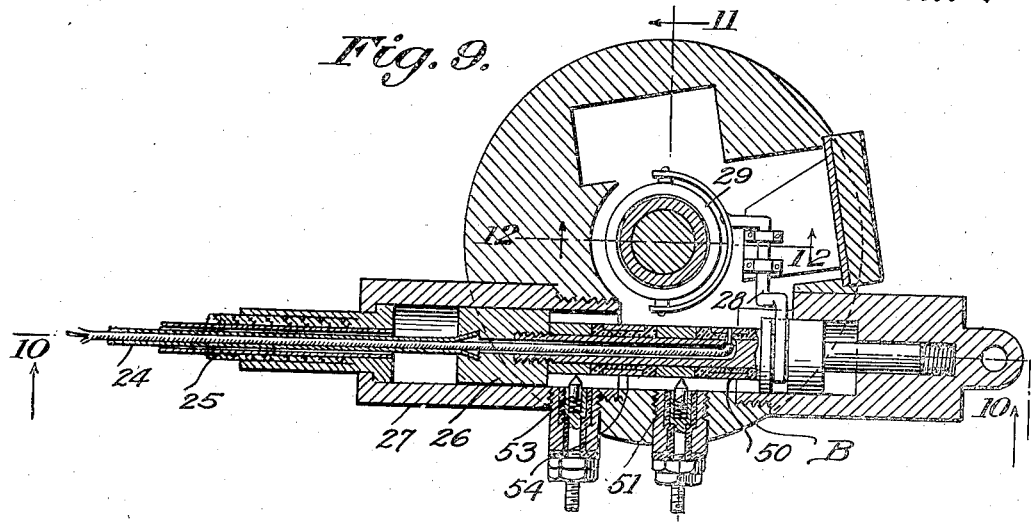
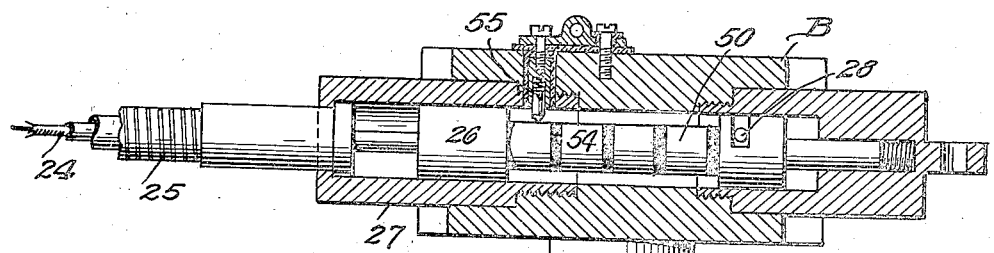
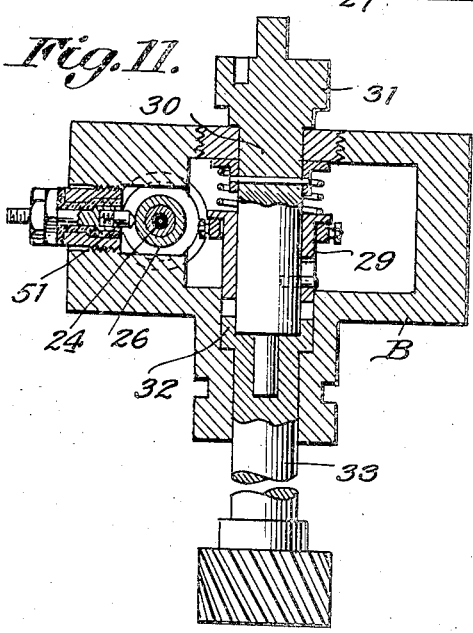
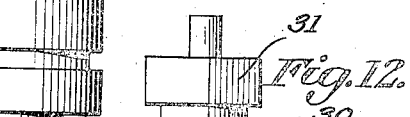
Charles L. Vick
Nathan Adams
INVENTOR
BY Victor J. Evans & Co.
ATTORNEYS

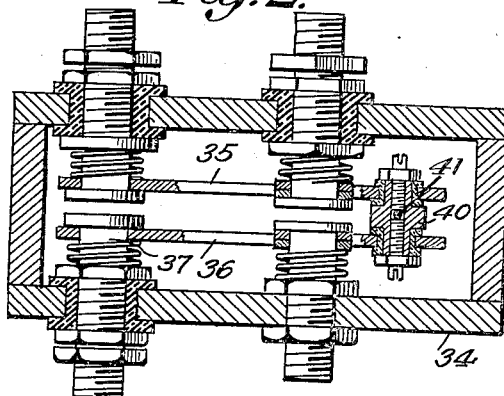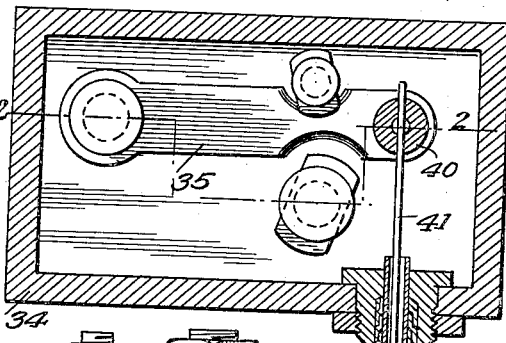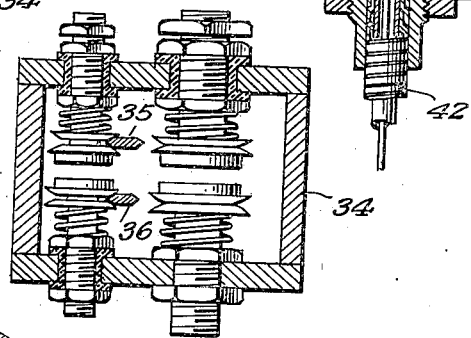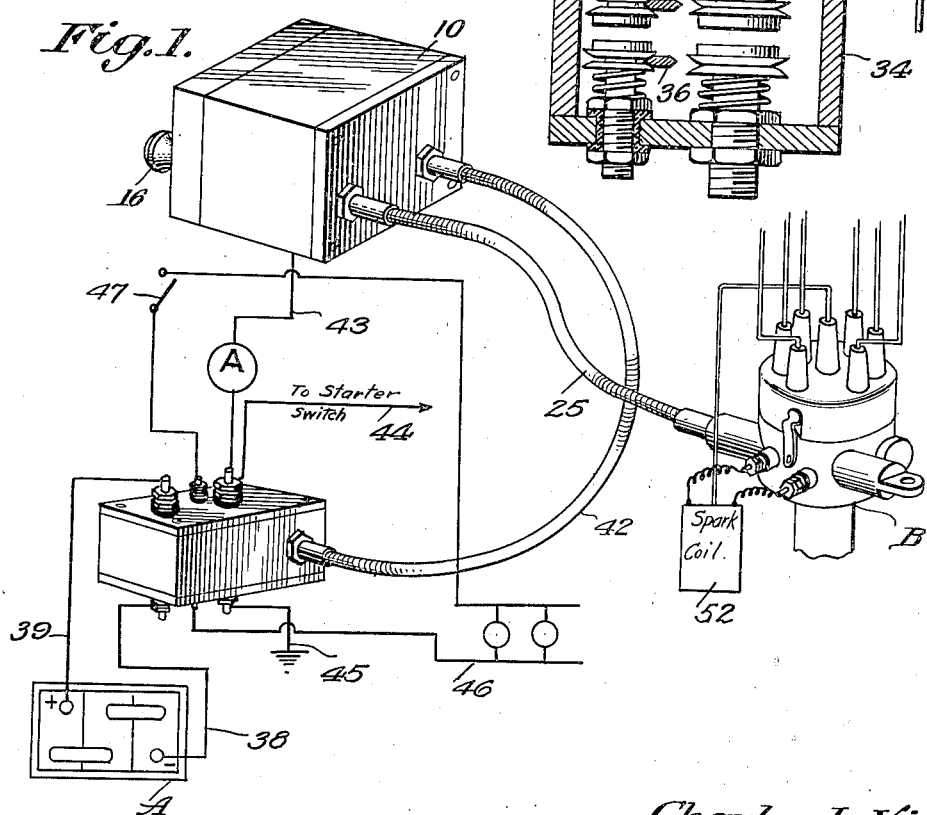

UNITED STATES PATENT OFFICE 1,968,726

ELECTRIC IGNITION AND BATTERY LOCK

Charles L. Vick and Nathan Adams, Jackson, Miss., assignors of thirty-five per cent to Earl V. Gurman, Jackson, Miss.

Application December 2, 1932, Serial No. 645,480

1 Claim. (Cl. 70—127)

The invention relates to a combined electric ignition and battery lock and more especially to a fire- and theft-proof ignition and battery lock for automobiles or the like.

The primary object of the invention is the provision of a device of this character, wherein the ignition controls and the battery circuit of automobiles can be locked so as to prevent the working of the ignition system and the charging thereof from the battery, thus rendering the automobile theft-proof as such ignition and battery can only be rendered operative by the person possessing a key to the lock mechanism which lock mechanism will release the controls for switches arranged in both the plus and minus leads of the circuit including the ignition and the battery.

Another object of the invention is the provision of a device of this character, wherein the ignition and battery are rendered inactive and the controls for the rendition of activeness thereof are locked against surreptitious actuation so that both the ignition system and the battery cannot be rendered effective for the working thereof in the automobile except by an authorized person, it being also impossible to manipulate the system by branching a circuit from the battery and outside of the layout of the ignition installation within the automobile, the device in its construction and arrangement being novel in its entirety.

A further object of the invention is the provision of a device of this character, wherein a lock makes secure against operation or functioning of the ignition system and also sets the distributor within an automobile so that the latter and likewise the ignition system will be inoperative, the lock regulating the securing and release of controls of the device so that when released the ignition system distributor and the battery will be rendered operative for the purpose of running the automobile.

A still further object of the invention is the provision of a device of this character, wherein the standard ignition system and the battery hook-up in an automobile are not materially altered or changed as the device is arranged in association therewith so that a perfect control may be had and frustrate any possibility of the theft of such automobile and also to assure the latter fireproof.

A still further object of the invention is the provision of a device of this character, wherein the ignition system and the battery for current supply is under the control of a key operated lock, the latter being conveniently arranged within the automobile for its use, the lock and adjuncts of the ignition and battery layout being novel.

A still further object of the invention is the provision of a device of this character which is comparatively simple in construction, thoroughly reliable and efficacious in its purposes as well as operation, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a perspective view of the device showing diagrammatically the circuit layout for the ignition and battery of an automobile, the battery distributor and device being shown in the circuit layout.

Figure 2 is a horizontal sectional view through the switch construction of the device.

Figure 3 is a vertical longitudinal sectional view thereof.

Figure 4 is a vertical transverse sectional view of the same.

Figure 5 is a vertical longitudinal sectional view through the lock and adjuncts of the device.

Figure 6 is a vertical transverse sectional view therethrough showing the double latching members engaged with the controls of the device.

Figure 7 is a view similar to Figure 6 showing the latching members in releasing position.

Figure 8 is a horizontal sectional view through the lock.

Figure 9 is a horizontal sectional view through the distributor of the ignition system of the automobile.

Figure 10 is a sectional view on the line 10—10 of Figure 9 looking in the direction of the arrows.

Figure 11 is a sectional view on the line 11—11 of Figure 9 looking in the direction of the arrows.

Figure 12 is a sectional view on the line 12—12 of Figure 9 looking in the direction of the arrows.

Similar reference characters indicate corresponding parts throughout the several views in the drawings.

Referring to the drawings in detail, the device constituting the present invention is associated with the electric battery A and distributor B of the ignition system of an automobile and comprises a box-like housing 10, the same being adapted preferably for arrangement upon the dash of the automobile and has therein a key operated lock 11 preferably of the tumbler type, the key 13 therefor being releasably insertable in the turning barrel 14 of such lock 12.

The housing 10 also has fitted therein the control plungers 15 and 16 respectively, the latter being for direct regulation of the distributor B and the other for the ignition system as will be hereinafter fully described. These plungers 15 and 16 are arranged beneath the lock 12 and disposed on opposite sides in parallelism therewith.

Pivoted interiorly of the housing 10 are latching dogs 17 for engaging notches 18 in the plungers 15 and 16 and such dogs are normally engaged with the plungers to prevent the outward pulling thereof from within the housing 10. Thus it should be apparent that normally the plungers 15 and 16 are latched against actuation. The dogs 17 are connected through a tensioning spring 19 common to both and such dogs are releasable by a cam 20 formed on the barrel 14 of the lock 12.

The cam 20 has provided therein recesses or sockets 21 and 22 respectively, for hook-like members 23 on the respective plungers 15 and 16. The hook-like members 23 retard the manipulation of the lock 12 after the plungers 15 and 16 have been pulled outwardly of the housing 10 as the hook-like members 23 register and are received in the sockets 21 and 22 on the cam 20. Therefore, before the lock can be reset or returned to normalcy it is necessary that the plungers 15 and 16 be pushed inwardly of the housing 10.

The plunger 16 has connected therewith a flexible wire or cable 24, the same being trained through a conduit 25 leading to the distributor B, the wire or cable 24 being connected to a slide 26 operating within the body 27 of the distributor B and this slide actuates a crank member 28 controlling the part 29 of a clutch. This part 29 is spring tensioned and slidably connected with the driven stud 30 of the distributor, arm 31 for the distributor B while the other part 32 of the clutch is in unity with the driving or timing shaft 33 for said distributor B. Thus it will be seen that when the plunger 16 is pulled outwardly in the housing 10 through the instrumentality of the wire 24 the slide 26 is actuated to throw the part 29 of the clutch into mesh with the part 32, thereby connecting the stud 30 with the shaft 33 so that the distributor B is now in a condition for operation in the ignition system of the automobile.

Arranged at some convenient point or place within the body of the automobile is a switch box 34 having arranged therein the pair of switches 35 and 36 respectively and coacting with pole terminals 37 within said box, the switch 35 being included in the minus lead while the switch 36 is included in the plus lead to and from the battery A, these leads being indicated at 38 and 39 respectively. The switches 35 and 36 are operated in unison through a crosshead 40 connected with a flexible wire 41 trained through a conduit 42 extending from the housing 10 to the box 34, the wire 41 being connected with the plunger 15 so that on the pulling outwardly of the plunger 15 from the housing 10 the wire 41 will operate the switches 35 and 36 in unison to close the ignition circuit 43 and the starter circuit 44, these circuits being interrelated and grounded at 45.

The switch 36 is also arranged in the parking light circuit 46 which is normally open and has a hand switch 47, the switch 35 being in a position under normalcy to complete the closing of the parking light circuit 46 by the hand switch 47 but when the switch 36 is moved from normalcy by the pulling out of the plunger 15 it breaks or opens the circuit 46 for the parking light.

The plunger 16 carries a contact ring 48 which is insulated from said plunger and through the spring contact 49 which under normalcy of the plunger 16 is engaged with the insulation for said ring 48 and on the pulling outwardly of the plunger 16 the ring 48 is engaged by the contact 49, whereupon the lead of the ignition circuit 43 will have been completed from the battery A through the switch 36 to the wire 24, thence to a contact ring 50 on the slide 26 by this ring engaging the spring contact 51, thence through the coil 52 of the primary circuit to spring contact 53, ring 54 and spring contact 55 which is connected to the circuit breaker, the ground being effected back to the battery as at 45. It is of course understood that plunger 15 is first pulled out from the housing 10 and then plunger 16 pulled out, yet the order of pulling may be reversed at the option of the user of the device.

It should be obvious that by the arrangement of the ground contact 56 in the housing 10 and normalcy of the plunger 16 contacting with ring 48 any external wiring by an unscrupulous or malicious person with respect to the device will be ineffective for the closing of the ignition circuit 43 and also concurrently therewith the operation of the distributor B, so that the device in the use thereof renders the system fireproof and likewise the automobile is rendered theft-proof.

What is claimed is:

In a lock of the character described, a housing for mounting conveniently within an automobile, key operated locking mechanism within said housing and including a turning barrel, a pair of control plungers slidably fitted in the housing for direct regulation of a distributor and electric ignition system, respectively, the plungers being disposed beneath the barrel and in parallelism with each other and having notches, latching dogs pivotally supported within the housing and engaging the notches in the plungers to maintain the same normally fixed, means for tensioning said dogs for urging the same in locking relation to the plungers, a cam formed on the barrel and operable upon the plungers to release the same and having sockets, and hook-like members on the plungers and engageable in the sockets when said plungers are moved from released position to maintain the barrel against turning movement to prevent resetting or return of the lock mechanism to normalcy.

CHARLES L. VICK.
NATHAN ADAMS.